Patented June 23, 1931

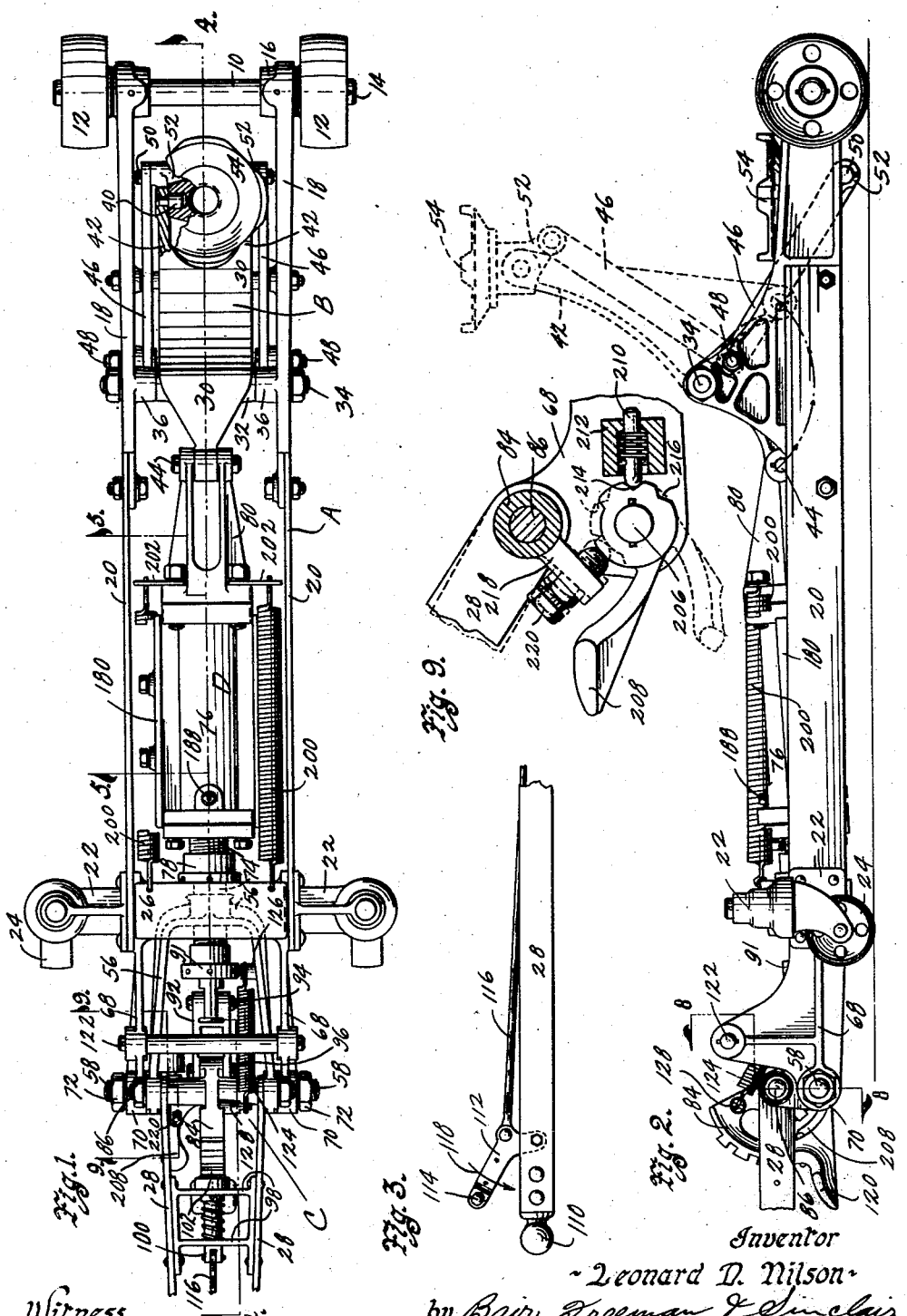

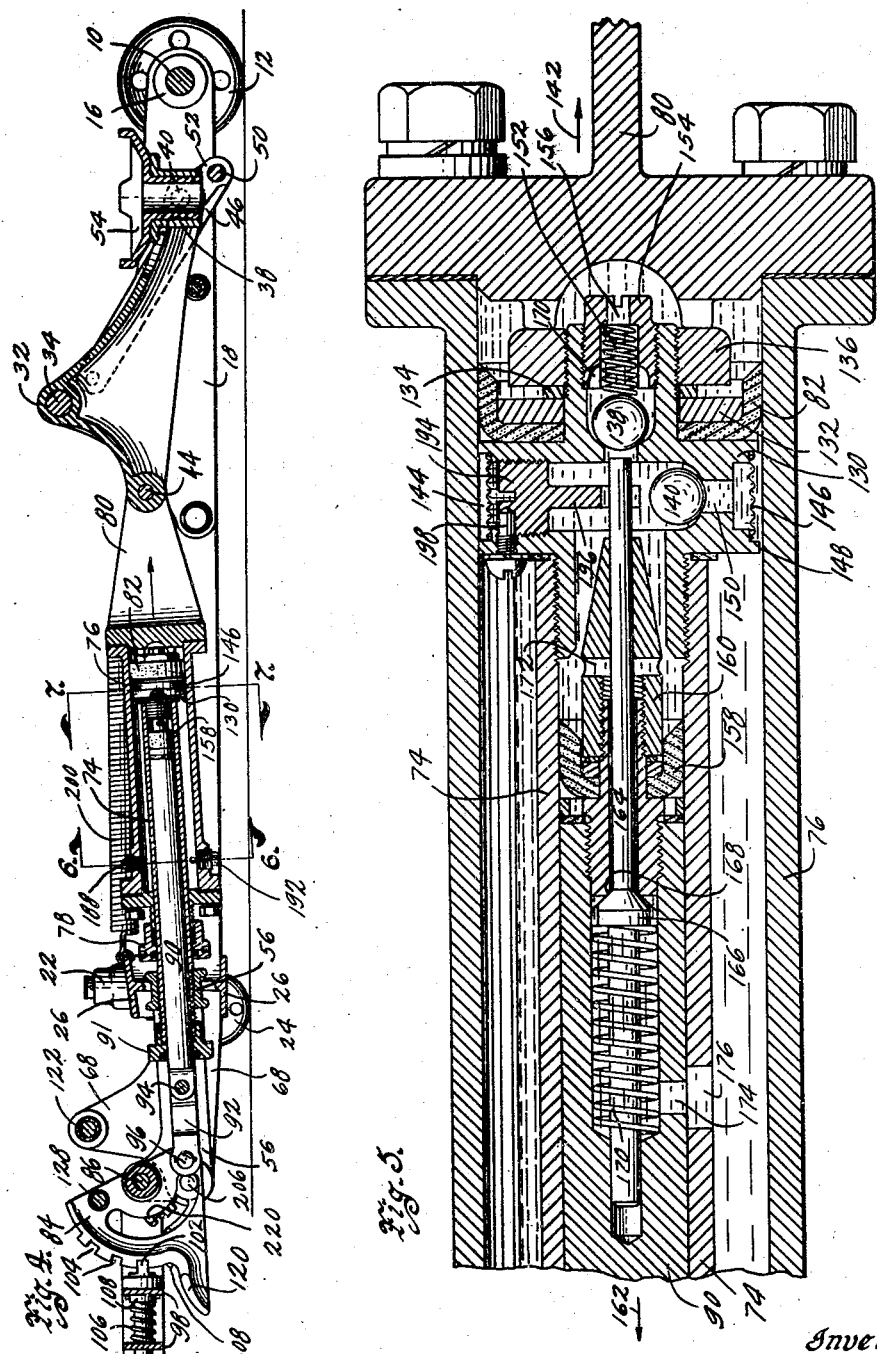

1,811,556

UNITED STATES PATENT OFFICE

LEONARD D. NILSON, OF WAYZATA, MINNESOTA, ASSIGNOR TO MARQUETTE MANUFACTURING COMPANY, OF ST. PAUL, MINNESOTA

HYDRAULIC JACK STRUCTURE

Application filed June 25, 1928. Serial No. 288,101.

The object of my invention is to provide a hydraulic jack structure of simple, durable and comparatively inexpensive construction.

A further object of my invention is to provide a jack structure having a low elongated frame provided with an actuating mechanism at one end thereof and a lifting mechanism at the other end thereof, a hydraulic connection being interposed between the two mechanisms for the purpose of actuating the lifting mechanism when the actuating mechanism is operated by manual power.

Still a further object is to provide in such a jack, a hydraulic mechanism designed so that it is compact and small and can therefore, be contained within a low frame so that the jack can easily be moved to position under automobiles for the purpose of raising them. It is particularly necessary to have a low frame where balloon tires are used on the automobile since the puncture of such a tire allows the axle of the automobile to assume a lower position than when ordinary tires are used.

More particularly it is my object to provide the hydraulic mechanism consisting of a piston rod pivotally supported on one end of the jack frame and having a piston on the end thereof, a cylinder being provided for covering and moving upon the piston and piston rod and the cylinder being operatively connected with the lifting mechanism of the jack.

Still a further object is to provide a pump structure within the piston rod for the purpose of transferring oil from one side of the piston to the other whereby the jack may be raised, the pump structure also including releasing mechanism for allowing lowering of the lifting mechanism upon overoperation of the pump structure.

Still a further object is to provide the releasing mechanism in the form of a releasing valve having means for engaging one of the check valves of the pump structure whereby both the releasing valve and such check valve, serve the purpose of allowing the oil to flow through the piston for the lowering operation of the lifting mechanism.

Still a further object is to provide the release valve for the purpose of preventing overloading of the jack by rendering its operation ineffective when too heavy a load is imposed on the lifting mechanism.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a plan view of my improved type of hydraulic lifting jack.

Figure 2 is a side elevation of the same.

Figure 3 is a side elevation of the operating handle which is shown broken off at the left hand end of Figure 2.

Figure 4 is a longitudinal sectional view on the line 4—4 of Figure 1.

Figure 5 is an enlarged detail sectional view through the hydraulic mechanism taken on the line 5—5 of Figure 1.

Figure 6:
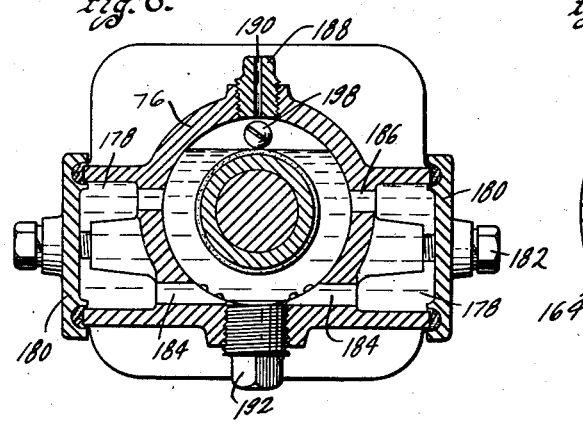
Figure 7:
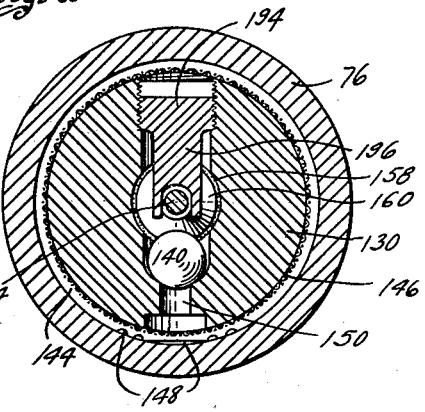

Figures 6 and 7 are enlarged detail sectional views through the hydraulic mechanism and taken on the lines 6—6 and 7—7 respectively of Figure 4.

Figure 8:
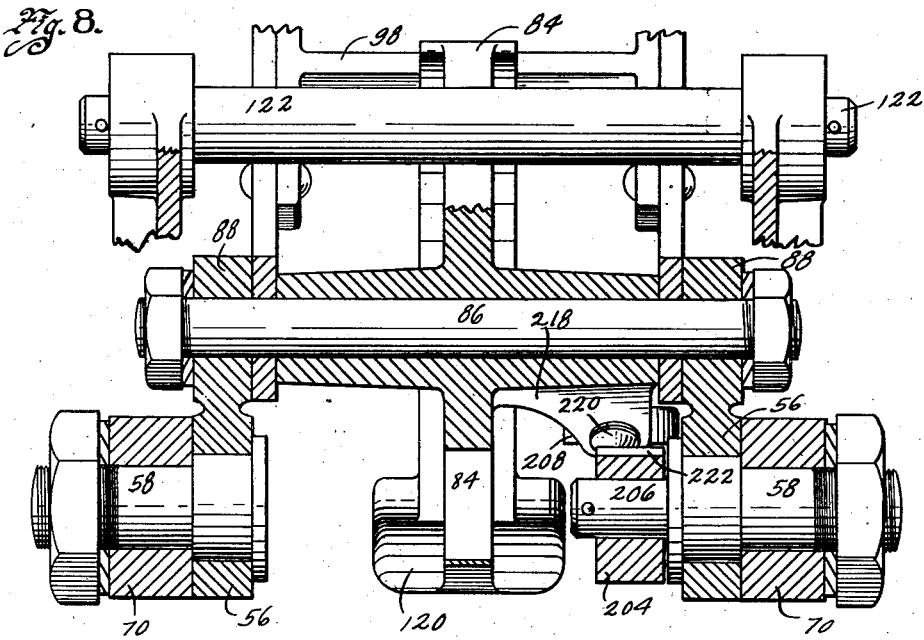

Figure 8 is an enlarged sectional view on the line 8—8 of Figure 2, illustrating the actuating mechanism; and Figure 9 is an enlarged sectional view on the line 9—9 of Figure 1.

On the accompanying drawings I have used the reference numeral 10 to indicate a front shaft. The shaft 10 is provided with wheels 12 held in position relative to the shaft by pins 14. The shaft 10 is secured to bearings 16 formed on a pair of side frames 18. Side bars 20 are secured to the frames 18 and extend rearwardly as clearly illustrated in Figures 1 and 2 of the drawings.

A pair of brackets 22 are secured to the side bars 20. Caster wheels 24 are swivelly mounted relative to the brackets 22. A yoke 26 serves to connect the rear ends of the bars 20 together and to brace the brackets 22 relative to each other.

The members of the jack thus far described, constitute an elongated low wheeled frame which I shall refer to generally by the reference character A and which is easily adapted to be moved to position under the axle of an automobile when a tire thereof has been punctured. The swivel wheels 24 allow easy steering of the jack which is easily handled by an operating lever 28 which will hereinafter be more fully described.

A lifting mechanism B is mounted at one end of the frame A and an actuating mechanism C is mounted at the other end thereof. A hydraulic mechanism D is provided for operatively connecting the mechanism B with the mechanism C and each of these mechanisms will hereinafter be specifically described.

The lifting mechanism B consists of a substantially triangular shaped arm 30 provided with a hub 32 at one of its corners. A pivot shaft 34 extends through the hub 32 and is supported in bearings 36 formed on the side frame members 18.

A vertically arranged sleeve 38 is pivotally supported on pins 40 extending from fork arms 42 formed on the lifting arm 30 as clearly shown in section in Figure 1. The hydraulic mechanism D is pivotally connected to another corner of the arm 30 by a pin 44.

For stabilizing the sleeve 38 and thereby keeping it in a vertical position with relation to the jack frame, I provide a pair of stabilizer arms 46. The arms 46 are pivoted at 48 to the side frames 18 and their free ends are pivoted on a pin 50. The pin 50 is supported in a pair of extensions 52 formed on the sleeve 38. A lifting head 54 is rotatably mounted in the sleeve 38 and is designed to engage the axle of the automobile.

The hydraulic mechanism D consists of a piston rod yoke 56 pivoted to pins 58 which are supported relative to the frame A. The manner of support of the pins 58 consists of extensions 60 extending rearwardly from the yoke 26 of the frame A and having bosses 70 thereon adapted to receive the pins 58. Nuts 72 are provided for rendering the pins 58 rigid with relation to the extensions 68 of the frame A.

A tubular piston rod 74 is secured to the piston rod yoke 56 whereby the piston rod may have pivotal movement relative to the frame A. A cylinder 76 is mounted on the piston rod 74 and slidable relative thereto. The rear head of the cylinder 76 is provided with a packing means 78 to prevent the leakage of oil or other actuating fluid used in the hydraulic mechanism between the rear head of the cylinder 76 and the piston rod 74. The front head of the cylinder 76 is provided with a ram arm 80 pivoted to the pin 44 of the lifting arm 30.

The ram arm 80 is bifurcated as clearly illustrated in Figure 1. A piston 82 is secured to the forward end of the piston rod 74 and mounted within the cylinder 76. The piston 82 in conjunction with the hear head of the cylinder 76, serves to axially align the cylinder 76 with the pivoted piston rod 74. Further details of construction of the hydraulic mechanism will hereinafter be brought forth.

The actuating mechanism C consists of a sector shaped member 84 oscillatably mounted on a pin 86. The pin 86 is supported in upwardly extending portions 88 of the piston rod yoke 56. A pump plunger 90 is reciprocably mounted in the tubular piston rod 74 and operatively connected to the sector 84 by a link 92 and pins 94 and 96. A packing nut 91 is provided to prevent the leakage of oil between the tubular piston rod 74 and the plunger 90.

The operating handle 28 is provided with a pair of cross members 98 through which a pin 100 is slidably mounted. The pin 100 is provided on its forward end with a flattened projection 102 adapted to selectively engage notches 104 formed in the sector 84. The pin 100 is constrained to cause engagement of the end 102 with the notches 104 by a spring 106 interposed between one of the cross members 98 and a collar 108 secured to the pin 100.

The rear end of the operating handle 28 is provided with a handle portion 110 adapted to be engaged by the operator for either oscillating the handle 28 or pulling and pushing the jack from one position to another. A bell crank lever 112 is pivoted to the handle 28 adjacent the handle portion 110 and is provided with a cross pin 114 which may be engaged by the fingers of the operator while holding the handle portion 110.

The lever 112 is connected by a pull rod 116 to the pin 100 whereby movement of the lever 112 in the direction of the arrow 118 will serve to disengage the end 102 of the pin 100 from any notch 104 which it may be in.

From the foregoing description, it will be obvious that the pump plunger 90 may be reciprocably operated by oscillating the operating handle 28 on its pivot shaft 86. The pump plunger may also be oscillated by foot power by oscillating the sector 84 by means of the operator's foot being placed on a pedal portion 120 formed on the sector 84.

When operated by foot power, the pin 100 must be withdrawn from the notches 104 and if desired, the handle 28 may be raised to such a position that it will rest against a removable stop pin 122 supported by the extensions 68 of the frame A. The foot pedal 120, of course, will be pushed downwardly by the foot of the operator and in order to return it upwardly, I provide a spring 124. The spring 124 is connected to a boss 126 formed on the piston rod yoke 56 and to a boss 128 formed on the sector 84.

Foot operation of the jack is used when it is desirable to quickly raise the lifting head 54 from a lowered position to a position engaging the axle of an automobile whereafter, slower operation with more power by using the operating handle 28 may be accomplished for raising the load.

The piston 82 I have illustrated as being of the leather-cup type although a metallic piston with metallic piston rings could be used for the same purpose. The cup 82 is secured to a piston head 130 which in turn is secured to the forward end of the tubular piston rod 74 as best shown in Figure 5. A pair of washers 132 and 134 and a nut 136, serve to secure the piston cup 82 to the piston head 130.

A pair of check valves 138 and 140 are mounted within the piston head 130 and in conjunction with the pump plunger 90, serve to form a pump structure for the purpose of transferring oil from the rear side of the piston 82 to the forward side thereof and preventing its reverse flow whereby the cylinder 76 may be caused to move in the direction of the arrow 142 and thereby swing the lifting arm 30 and raise the lifting head 54, to the dotted line position shown in Figure 2.

The piston head 130 is provided with an annular recess 144 around which a cleaner screen 146 is secured. Passageways 148 are provided in the piston head 130 to allow the flow of oil from the rear side of the piston head 130 to the passageway 150 leading to the check valve 140. The check valve 140 is actuated to closed position by gravity.

The check valve 138 is actuated to closed position by a spring 152. The spring 152 is supported in a plug 154 inserted in the forward end of the piston head 130. A passage 156 is provided in the plug 154 to allow oil to flow therethrough from the check valve 138 to the forward head of the cylinder 76 or in reverse direction.

The pump plunger 90 is provided on its forward end with a cup leather 158 held in position with respect to the plunger by a nut 160. It will be obvious that movement of the plunger 90 in the direction of the arrow 162 will draw oil through the check valve 140 and that movement of the plunger in an opposite direction will force this oil through the check valve 138 for the purpose of raising the load lifting head 54.

For lowering the lifting head 54, I provide the following described mechanism. A valve stem 164 is slidably mounted in the pump plunger 90. The stem 164 has formed thereon, a release valve 166 adapted to be normally seated against a valve seat 168 by means of a spring 170. In Figure 5 it will be noted that the forward end of the stem 164 does not quite touch the check valve 138, however, movement of the plunger 90 a little further in the direction opposite to the arrow 162, will cause engagement of the stem 164 with the ball 138 and thereby open the valve 138 since the spring 170 is considerably stronger than the spring 152.

After being opened a predetermined amount, the ball 138 will contact with the plug 154 and the valve member 166 will be moved away from its seat 168. Oil may now flow through the passageway 156 of the plug 154 and through slots 170 in the plug 154 and around the check valve 138. The oil will then flow through holes 172 in the nut 160 and along the valve stem 164 past the open valve 166 and then through openings 174 and 176 formed in the plunger 90 and the piston rod 74 respectively. In addition to serving as a release valve for lowering of the lifting head 54, the valve 166 serves the purpose of a safety valve to prevent overloading of the jack as will hereinafter be described.

In leaving the opening 176, the oil flows into the cylinder 76 back of the piston head 130 and this portion of the cylinder 76, therefore, acts as a reservoir. However, the reservoir portion of the piston 76 is insufficient because of the changeable displacement of the piston rod 74 as it moves inwardly and outwardly with respect to the cylinder 76 and I therefore, provide auxiliary reservoirs 178 formed on the sides of the cylinder 76 as clearly illustrated in Figure 6. The auxiliary reservoirs 178 are covered by cover plates 180 held in position by cap screws 182 and are hydraulically connected with the interior of the cylinder 76 by means of openings 184. Openings 186 are provided to prevent trapping air in the reservoirs 178.

A filling plug 188 is provided for originally filling the cylinder 76 and the reservoirs 178 with oil and for replenishing the supply of oil which might be reduced by evaporation or leakage. The plug 188 is provided with a vent opening 190 to allow the inflow and outflow of air due to the change of volume within the cylinder as air is variably displaced by the piston rod 74. A drain plug 192 is provided for draining the oil from the cylinder and reservoirs.

A plug 194 is screwed into the piston head 130 and has a downwardly extending arm 196 adapted to prevent movement of the check ball 140 too far away from its seat. The arm 196 is bifurcated as illustrated in Figure 7 to provide for the valve stem 164. A locking screw 198 is threaded through the piston head 130 and extends into the plug 194 to prevent its acccidental turning whereby it might interfere with the operation of the valve stem 164.

From the foregoing description, it will be obvious that a certain amount of oscillation of the sector 84 will actuate the pump structure for raising the lifting head 54, the check valves 138 and 140 functioning during such operation. However, when the pump plunger 90 is moved to a predetermined distance farther forward than illustrated in Figure 5, the check valve 138 will be opened by the stem 164 and the valve 166 will be opened for allowing oil in front of the piston 82 to be forced back of the piston and into the reservoirs.

Thus the jack may be operated for either lifting or lowering movement and the lowering thereof may be nicely controlled by the amount of opening of the valves 138 and 166. When there is no load on the lifting head 54, the jack is brought to lowered position by means of springs 200 secured at one end to the frame yoke 26 and at the other end to arms 202 connected with the cylinder 76.

In Figure 9 of the drawings, I have illustrated a stop mechanism E whereby movement of such mechanism to a predetermined position will allow the sector 84 to be oscillated only far enough to operate the pump structure for raising the lifting head 54. The mechanism E can be moved to another position for allowing movement of the pump plunger 90 to such a position that the valves 98 and 166 will be opened whereby the lifting head may be lowered.

The mechanism E consists of a cam 204 oscillatably mounted on a stud extension 206 on one of the pivot bolts 58 of the piston rod yoke 56. The cam member 204 is provided with a foot pedal 208 and is held in either one of two positions by a spring actuated pin 210. The pin 210 is slidably mounted in a boss 212 formed on the yoke 56 and coacts with notches 214 and 216 formed in the cam 204.

A lug 218 is formed on the sector 84 and a cap screw 220 is threaded through the lug 218 to serve as a stop. By threadedly mounting the cap screw 220 it may be adjusted as desired. The lower end of the cap screw 22 normally contacts with the outer surface of the cam 204 as shown in full lines in Figure 9. This occurs, of course, only when the sector 84 is moved to its lowest position whereby the outer surface of the cam 204 acts as a limit stop in one direction, the removable pin 122 acting as a limit stop in the other direction. When the outer surface of the cam 204 is used as a stop, the pump plunger 90 can move only to the position illustrated in Figure 5.

A notch 222 is provided in the cam 204 and when the foot pedal 208 is moved to the dotted line position, the bottom of the notch 22 serves as a limit stop for the lower end of the cap screw 220. When the cam is in this position, the valves 138 and 166 may be opened upon downward movement of the pedal 120 or the operating handle 28 to their lowest possible position.

The pin 122 is made removable so that when it is desirable to ship the jack, the handle 128 may be swung to such a position that it lays on the hub 32 of the lifting arm 30. The jack, therefore, may be folded into quite a compact position for minimizing its shipping space. The pin 122 serves to normally hold the operating handle 128, in a substantially vertical position so that it may easily be grasped by an operator when it is standing idle in the garage. Having thus described my invention, I will briefly summarize its operation.

*Practical operation*

In the operation of my jack, it is first brought into position for raising the axle of the automobile. The pin 100 is then caused to disengage the sector 84 whereupon the sector may be oscillated for quickly actuating the pump structure and causing the lifting head 54 to engage the axle of the automobile. The pin 100 is then released whereby the operating handle 28 is connected with the sector 84 and the jack is then hand operated for raising the axle of the automobile.

After the axle has raised a sufficient distance it will be automatically held in such position by the check valve 138. When it is desired to lower the lifting head, the release pedal 208 is lowered to the dotted line position illustrated in Figure 9 and the pedal 220 or the lever 128, then moved to their lowest position for opening the valves 138 and 166 and allowing the oil to flow from the front side of the piston 82 to the rear side thereof and into the reservoirs.

The pedal 208 may then be raised by the toe of the operator for assuming its normal position whereby the jack may be immediately operated for raising when again desired for use.

In the event that too much load is imposed upon the lifting head 54, forward motion of the plunger 94 instead of forcing oil through the check valve 138 will merely open the release valve 166 against the action of the spring 170 and allow the oil to flow back into the reservoir instead of being utilized for raising the lifting head.

Thus the operation of the jack is rendered ineffective when the jack is overloaded with an automobile heavier than intended for the strength of materials in the jack. The spring 170, of course, will be made of the proper strength to conform to the rated capacity of the jack as determined by the manufacturer.

Various changes such as changes in the construction of the various mechanisms of the jack may be made without patentably departing from the real spirit and purpose of my invention, and it is my intention to cover by my claims, any modified forms of structure or use of mechanical equivalents, which may be reasonably included within their scope.

I claim as my invention:

1. In a jack structure, a frame, a lifting arm pivoted thereon and a hydraulic actuating mechanism having one end pivoted to said frame and its other end pivoted to said lifting arm for swinging the same when the hydraulic mechanism is actuated, said mechanism comprising a piston rod and a cylinder slidable relative thereto and a pump structure in said piston rod.

2. In a jack structure, a frame, a lifting arm pivoted thereon and a hydraulic actuating mechanism comprising a piston rod pivoted to said frame, a pump structure contained in said piston rod and a cylinder movable with respect to said piston rod and operatively connected with said lifting arm.

3. A jack comprising a frame, a lifting arm pivoted thereon, an extensible hydraulic actuating mechanism having its ends pivoted to said frame and said lifting arm respectively and means for operating said mechanism to cause its extension and contraction, said means comprising a pump structure mounted within the hydraulic mechanism and including check valves, means for forcing one of said valves away from its seat to render it inoperable whereby the jack may be lowered, said last means comprising a releasing valve structure including a valve stem adapted to engage said check valve adapted to be rendered inoperable.

4. A jack comprising a frame, a lifting arm pivoted thereon, an extensible hydraulic actuating mechanism having its ends pivoted to said frame and said lifting arm respectively and means for operating said mechanism to cause its extension and contraction, said means comprising a pump structure mounted within the hydraulic mechanism and including check valves, means for forcing one of said valves away from its seat to render it inoperable whereby the jack may be lowered, said last means comprising a releasing valve structure including a valve stem adapted to engage said check valve adapted to be rendered inoperable, said releasing valve also being opened when its valve stem so engages the check valve.

5. In a jack structure, a frame, a lifting arm pivoted thereon and a hydraulic actuating mechanism having one end pivoted to said frame and its other end pivoted to said lifting arm for swinging the same when the hydraulic mechanism is actuated, said mechanism comprising a reservoir, a piston rod, a cylinder slidable relative thereto, a pump structure in said piston rod including check valves and a releasing valve structure mounted in said pump structure and adapted to receive oil from between said check valves and discharge it into said reservoir to prevent actuation of the jack when overloaded.

6. In a jack structure, a horizontal and relatively long low wheeled frame, lifting means at one end thereof and actuating means at the other end thereof, a hydraulic connection between said lifting means and said actuating means and including a pump structure adapted to extend the hydraulic connection and a release mechanism in said pump structure adapted to function upon over-operation of the pump structure and means to normally prevent such over-operation, said last means comprising a cam rotatably mounted and adapted to engage said actuating mechanism, a notch being provided in said cam for engagement with said actuating mechanism when the cam is rotated out of normal position.

7. In a jack structure, a horizontal and relatively long low wheeled frame, lifting means at one end thereof and actuating means at the other end thereof, a hydraulic connection between said lifting means and said actuating means and including a pump structure adapted to extend the hydraulic connection and a release mechanism in said pump structure adapted to function upon over-operation of the pump structure and means to normally prevent such over-operation, said last means comprising a cam rotatably mounted and adapted to engage said actuating mechanism, a notch being provided in said cam for engagement with said actuating mechanism when the cam is rotated out of normal position, a foot pedal for actuating said cam and resilient friction means for maintaining said cam in either its normal or out of normal positions.

8. A jack structure comprising a frame, an actuating mechanism oscillatably mounted and a hydraulic mechanism pivotally mounted on one end thereof, a lifting head movably mounted on the other end thereof and operatively connected with said hydraulic mechanism, said hydraulic mechanism comprising a piston rod anchored at one end, a piston on said piston rod, a pump structure mounted in said piston rod and adapted to transfer oil from one side of said piston to the other side thereof and a cylinder movable with respect to and enclosing said piston and piston rod and adapted to act as a ram for moving said lifting head.

9. A jack structure comprising a low wheeled horizontally arranged elongated frame, a lifting head mounted on said frame at one end thereof, an actuating mechanism on the other end of said frame, means of connection between said mechanism and lifting head including a hydraulic pump structure having a piston, a cylinder mounted on and receiving said piston, said cylinder constituting a reservoir for the fluid actuating said structure, said cylinder having operative connection with the lifting head and movable therewith and relative to said piston and means located within the piston responsive to the load upon said lifting head for rendering the actuating mechanism ineffective when the lifting head is overloaded.

10. A jack structure comprising a low wheeled horizontally arranged elongated frame, a lifting head mounted on said frame at one end thereof, an actuating mechanism on the other end of said frame, means of connection between said mechanism and lifting head including a hydraulic pump structure having a piston, a cylinder mounted on and receiving said piston, said cylinder constituting a reservoir for the fluid actuating said structure, said cylinder having operative connection with the lifting head and movable therewith and relative to said piston and means located within the piston for allowing oil to be transferred from one side thereof to the other but normally preventing its return, a portion of said last means being operable by over-operation of the means within the piston for the purpose of allowing oil to flow in an opposite direction for lowering the lifting head.

11. A jack structure comprising a low wheeled horizontally arranged elongated frame, a lifting head mounted on said frame at one end thereof, an actuating mechanism on the other end of said frame, means of connection between said mechanism and lifting head including a hydraulic pump structure having a piston, a cylinder mounted on and receiving said piston, said cylinder constituting a reservoir for the fluid actuating said structure, said cylinder having operative connection with the lifting head and movable therewith and relative to said piston and means located within the piston for allowing oil to be transferred from one side thereof to the other but normally preventing its return, a portion of said last means being operable by over-operation of the means within the piston for the purpose of allowing oil to flow in an opposite direction for lowering the lifting head, said last means also serving to render the actuating mechanism ineffective when the lifting head is overloaded.

Des Moines, Iowa, June 8, 1928.

LEONARD D. NILSON.